United States Patent
Lee (10) Patent No.: US 7,890,253 B2
(45) Date of Patent: Feb. 15, 2011

(54) LOCATION INFORMATION SHARING METHOD BASED ON WIRED AND WIRELESS INTERNET USING LOCATION ID

(75) Inventor: Sang-Zee Lee, Daejeon (KR)

(73) Assignee: GG21 Co., Ltd., Doejeon (KR)

(*) Notice: Subject to any disclaimer, the term of this patent is extended or adjusted under 35 U.S.C. 154(b) by 536 days.

(21) Appl. No.: 12/042,114

(22) Filed: Mar. 4, 2008

(65) Prior Publication Data
US 2008/0153517 A1    Jun. 26, 2008

Related U.S. Application Data

(63) Continuation-in-part of application No. 10/542,251, filed on Jul. 15, 2005, now Pat. No. 7,409,282.

(30) Foreign Application Priority Data
Jan. 20, 2003    (WO) .................... PCT/KR03/000120

(51) Int. Cl.
*H04Q 7/20* (2006.01)
*G08G 1/12* (2006.01)
*G06F 17/00* (2006.01)

(52) U.S. Cl. .................. 701/207; 701/209; 701/211; 455/456.2; 370/352

(58) Field of Classification Search ............. 701/207, 701/209, 211, 213; 455/457, 456.2; 707/201; 370/252, 352
See application file for complete search history.

(56) References Cited

U.S. PATENT DOCUMENTS 6,754,181 B1 *    6/2004    Elliott et al. ............. 370/252
2002/0064149 A1 *    5/2002    Elliott et al. ............. 370/352

* cited by examiner

Primary Examiner—Tan Q Nguyen
(74) Attorney, Agent, or Firm—Dinsmore & Shohl LLP (57) ABSTRACT

Location information sharing method based on wired and wireless internet using a location identification (ID). Converting a location ID entered in the content of documents through Internet terminals into a URL, which provides location ID related services to the Internet terminal. Searching a desired location information from one of plural location information servers by using the location ID, wherein the general web server connects with one of plural location information servers by using the location ID through the domain name management server and request the connected location information server to search a location information corresponding to the location ID. Transmitting the location information including a coordinate value searched corresponding to the location ID from the location information server to the wired or wireless terminal requesting the location information. Performing application function including viewing map around a location coordinate contained in the searched location information corresponding to location ID.

7 Claims, 4 Drawing Sheets

LOCATION INFORMATION SHARING METHOD BASED ON WIRED AND WIRELESS INTERNET USING LOCATION ID

RELATED APPLICATIONS

The present application is a Continuation-in-Part of U.S. application Ser. No. 10/542,251 filed Jul. 15, 2005, now U.S. Pat. No. 7,409,282 which claims priority under 35 U.S.C. 371 to PCT/KR2003/000120. The entire disclosures of which are hereby incorporated by reference.

TECHNICAL FIELD

The present invention relates to a location information sharing method based on wired and wireless internet using location ID (Identification). More particularly, the present invention relates to a location information sharing method based on wired and wireless internet using location ID in a structured form such as 'PointID#DomainName' where 'DomainName' is a unique domain name of a location information server 20a to 20n or a unique keyword corresponding to a usual domain name or a IP address of a location information server, 'PointID' is a keyword, uniquely determined and registered in a location information server, representing its related location information and '#' symbol. The above 'DomainName' is registered in 'domain name management server' 30. Location information including a location coordinate and its corresponding location ID is registered in one of plural location information servers 20a to 20n from one of wired and wireless Internet terminals 10a to 10n. The above registered location information is accessed and searched by using the above location ID and the searched location information is shared for utilization by the wired and wireless Internet terminals.

BACKGROUND ART

Recently, with an increase in the demand for using Internet, products of various kinds combining a wired and wireless Internet function and a GPS (Global Positioning System) function have been developed and utilized. Additionally, the GPS function is also embedded in mobile telephones. According to the above current, application fields of location information is increasing, and especially, services for providing location information to or through Internet terminals have been increased rapidly.

In general, to provide a location information service through the Internet terminals, a method that searches a specified location by utilizing a conventional identifier capable of representing the location to be searched, such as an address, a trade name, a telephone number, a zip code, or keyword determined uniquely in a server, and indicates the searched result on an electronic map has been used mainly.

However, the conventional method for providing the location information has several problems that it is occasionally impossible to search a desired location at places where there is no identifier, such as mountains, seas, or others, and that it is inconvenient in use because a user must find object with a desired trade name using additional information, such as an address, in the case where there are lots of objects with the same trade name even though it is possible to search. Furthermore, the conventional method for providing location information has another problem that it is difficult to apply single software because the addresses are formed in different way by countries.

Especially, in case of addresses based on parcel or lot numbers, the conventional method for providing location information has a restriction that one point location cannot be indicated by the above address, because the parcel or lot numbers represent not a point location but a field or area location.

Additionally, even in case of a keyword unique in a server, the conventional method for providing location information has a restriction that location information can't be accessed without the additional address information for connecting with a location information server storing the above keyword and its location information since the conventional keyword itself is a text string and does not include any IP address or others necessary for connecting with the location information server.

Moreover, the conventional method for providing the location information has a further problem that it is difficult to share location information databases in the case where service providers provide services through their own software and data format in a state that there is no standardized international format for indicating the same location information or in the case where the trade names stored in the databases by the service providers are different from one another.

Additionally, the conventional method for providing location information has other problems that it is difficult to share location information in the case that the location information is transferred through the Internet terminal in an image type after being copying from a map view screen or in a text type for explaining the location.

Furthermore, the conventional method for an Internet terminal to get location information from the plural location information servers distributed through Internet using a conventional location Identifier itself is not available, since the conventional location identifier such as an address, a trade name, a telephone number, a zip code, or even a keyword determined uniquely in a server itself does not include any IP address or others necessary for connecting with the location information server and, therefore, an Internet terminal does not know which location information server the desired location information corresponding the conventional location identifier registered and stored at and can't connected with it for accessing the desired location information.

DISCLOSURE OF INVENTION

Accordingly, the present invention has been made in view of the problems, and an object of the present invention is to provide a location information sharing method based on wired and wireless internet using location ID in the structured form of 'PointID#DomainName', by which location information including a location coordinate and its corresponding location ID is entered from a Internet terminal and registered into one of plural location information servers 20a to 20n, and the registered location ID is commonly used for searching and utilizing its corresponding location information by the wired or wireless Internet terminals 10a to 10n.

Another object of the present invention is to provide a location information sharing method based on wired and wireless internet using location ID in the structured form of 'PointID#DomainName', by which an Internet terminal presents the searched location information on an electronic map after searching the desired location information from one of plural location information servers 20a to 20n by using a location ID selected on the screen of the terminal by a user after receiving from other terminals or after displaying document including the location ID, and performs a navigation function, if a navigation function is available on the Internet terminal, by designating the location information as a destination point.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages, and according to an aspect of the invention, there is provided a location information sharing method based on wired and wireless internet using location ID, which is characterized by inputting the location information including a location coordinate and its corresponding location ID in the structured form of 'PointID#DomainName' through one or more wired and wireless Internet terminals to register the location information to one of plural location information servers;

writing a location ID in the various documents;

converting a desired location ID into the form of URL, such as 'http://epmap.egosio.com/d/?epid=PointID&epdn=DomainName' as an example, including 'PointID' and 'DomainName' of location ID as parameters as well as the domain name of web site (http://epmap.egosio.com) for providing the location ID related information or service;

transmitting location ID or the above converted URL between terminals;

searching the registered location information by using 'PointID' of the location ID after a terminal is connected to one of plural location information server corresponding to 'DomainName' of the location ID through domain name management server 30 when user selects the corresponding location ID or the converted URL to request the location information if the location ID is transferred or received between the wired and wireless Internet terminals or if the location ID contained in various documents is selected by a user;

and transmitting the searched location information to the wired or wireless Internet terminal requesting the location information.

The location information sharing method based on wired and wireless internet using location ID includes the steps of:

checking whether or not the location information is registered, and registering the location information if the desired location ID is not registered; inputting or selecting the location ID through the wired and wireless terminals if the desired location information is registered;

converting a desired location ID into the form of URL, such as 'http://epmap.egosio.com/d/?epid=PointID&epdn=DomainName' as an example, including 'PointID' and 'DomainName' of location ID as parameters as well as URL of web site for providing the location ID related information or service;

transmitting the location ID or its converted URL to other wired and wireless Internet terminals;

selecting the received location ID on the wired and wireless Internet terminal of a receiving side to request the location information;

automatically connecting to the corresponding location information server by using 'DomainName' through 'Domain name management server' 30, and searching the registered location information, in the connected location information server, by using 'PointID';

and checking the searched result, and transmitting the searched location information to the wired and wireless Internet terminal requesting the location information.

It is preferred that the location information sharing method based on wired and wireless internet using location ID further includes the step of indicating the searched location information on an electronic map of the wired and wireless Internet terminal.

It is preferred that the location information sharing method based on wired and wireless internet using location ID further includes the step of performing a navigation function by designating the searched location information as a destination.

It is preferred that the location information sharing method based on wired and wireless internet using location ID further includes the step of transmitting an error code of search failure to the wired and wireless Internet terminal requesting the location information if the searched result is not performed normally.

The location information sharing method based on wired and wireless internet using location ID includes the steps of:

checking whether or not the location information is registered, and registering the location information if not registered;

inputting the location ID into contents of various document of the wired and wireless Internet terminal or loading the various document containing the location ID, if the location ID is registered;

checking if the text string entered into document is in the desired format of the location ID such as 'PointID#DomainName' or not, and automatically converting the location ID into the form of URL mentioned above or into smart tag or other similar way; selecting the location ID corresponding to the desired location information registered at one of the plural location information servers;

transmitting the selected location ID or its converted URL mentioned above to other terminal;

connecting to the desired location information server corresponding to 'DomainName' of the location ID through the domain name management server 30, and searching the desired location information by using 'PointID' of the location ID; and transmitting the searched location information to the wired and wireless Internet terminal requesting the location information by the location ID.

It is preferred that the various documents include documents made by a PIM (Personal Information Management) software having an address book, a calendar, a note pad and others, documents made by writing function in bulletin board on Web-pages, documents made by various document writing software or editor, documents written as an E-mail, documents made by messengers, and documents made by a SMS (Short Message Service) of cellular phones.

It is preferred that the step of registering the location information includes the steps of: inputting a location coordinate desired to register through the wired and wireless Internet terminals;

inputting the location ID corresponding to the location coordinates; connecting to the location information servers corresponding to the location ID, and checking whether or not the location ID is duplicated;

and registering the location ID at the location information server.

It is preferred that in the step of inputting the location coordinate, if the wired and wireless Internet terminal includes a GPS (Global Positioning System) receiver or European Galileo receiver, the present location coordinate is automatically inputted through the GPS receiver.

It is preferred that in the step of inputting the location coordinate, a value of the location coordinate is directly inputted in letters or figures through the wired and wireless Internet terminal if the user knows the value of the location coordinate, and the location is indicated on the electronic map on the wired and wireless Internet terminal by using an address, a trade name, a telephone number or an index map and the value of the location coordinate of the location designated on the electronic map by the user is automatically inputted if the user does not know the value of the location coordinate.

It is preferred that the location ID is formed by combination of a 'PointID' determined by each location by the user when the location information is registered, a location ID symbol selected to discriminate from an E-mail ID symbol, and 'DomainName'

It is preferred that the location ID symbol is #, !, $, %, & or *.

It is preferred that the wired and wireless Internet terminals are computers, notebooks, cellular phones, PDAs (Portable Digital Assistants), GPS terminals and telematics terminals capable of wired or wireless internet connection.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings. For reference, like reference characters designate corresponding parts throughout several views.

Figure 1:
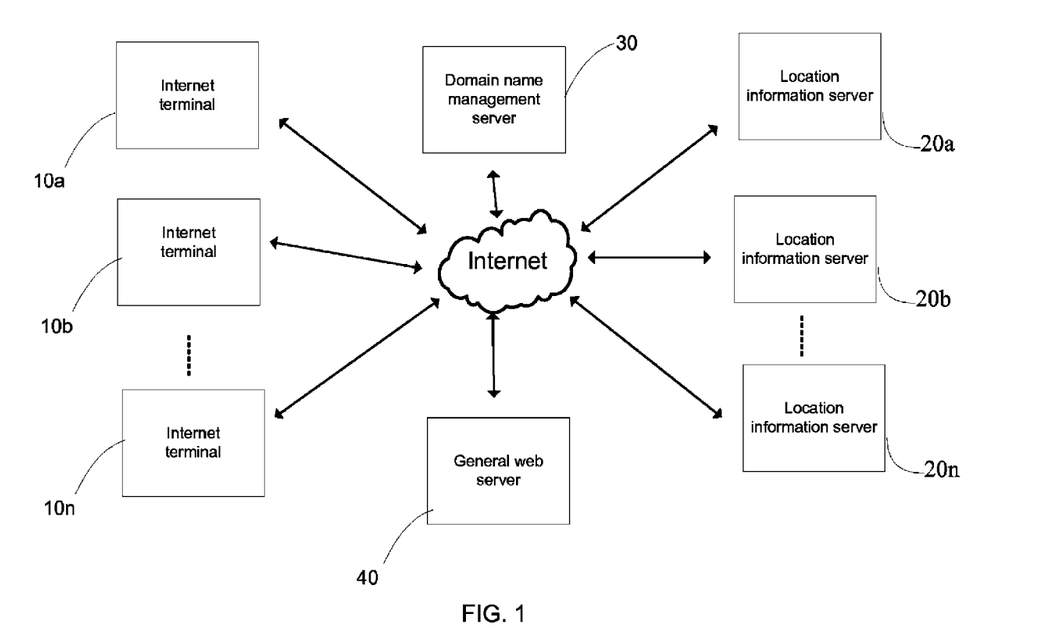
FIG. 1 is a system block diagram for briefly explaining a method for sharing location information based on wired and wireless Internet using location ID according to the present invention.

FIG. 1 is a system block diagram for briefly explaining a method for sharing location information based on wired and wireless Internet using location ID according to the present invention.

First, users input location information including a desired location coordinate and its corresponding location ID (Identification) in the structured form of 'PointID#DomainName' using one or more wired or wireless Internet terminals 10a to 10n, and register the location information into one or more location information servers 20a to 20n (see a flow chart of FIG. 4) which is connected by the Internet terminals 10a to 10n through the domain name management server (see FIG. 1). Here, it is preferable that the format of the location ID inputted through the wired and wireless Internet terminals 10a to 10n is combination of 'PointID' determined uniquely in a location information server for each location information by the user when the location information is registered, a location ID symbol selected to discriminate from an E-mail ID symbol, and 'DomainName'.

That is, the location ID symbol may be #, !, $, %, &, * or others excepting @ which is the E-mail ID symbol. For an example, in the case where the user wants to decide the user ID corresponding to the desired location information as "szeelee" and register the location information including the location coordinate and the location ID into a location information server with domain name of 'www.gg21.co.kr', the location ID may be indicated as "szeelee#gg21.co.kr".

After the location information including the location coordinate and the location ID is registered into the location information servers 20a to 20n, in the case where the location ID is transmitted and received through the wired and wireless Internet terminals 10a to 10n or included in various documents, the location ID can be selected by a user to search the location information corresponding to the selected location ID from the desired one of the plural location information servers 20a to 20n distributed through the wired or wireless Internet.

When the user selects the location ID, the user's terminal is connected to one of the plural location information servers 20a to 20n corresponding to 'DomainName' in which the location ID is registered through the domain name management server 30, the location information corresponding to 'PointID' is searched and transmitted to the wired and wireless Internet terminal 10a to 10n requesting the location information by using location ID, so that the searched and received location information is indicated on an electronic map or can perform a navigation function by designating the searched and received location information as a destination.

It is preferable that the wired and wireless Internet terminals 10a to 10n include computers, notebooks, cellular phones, PDAs (Personal Digital Assistants), GPSs (Global Positioning Systems) and telematics terminals. The location information servers 20a to 20n are wired or wireless Internet servers.

Additionally, it is preferable that the location information servers 20a to 20n include database systems and/or database management systems (not shown in drawings) for storing and managing the location information including the location coordinate and the corresponding location ID inputted from the users' wired and wireless Internet terminals 10a to 10n.

Figure 2:
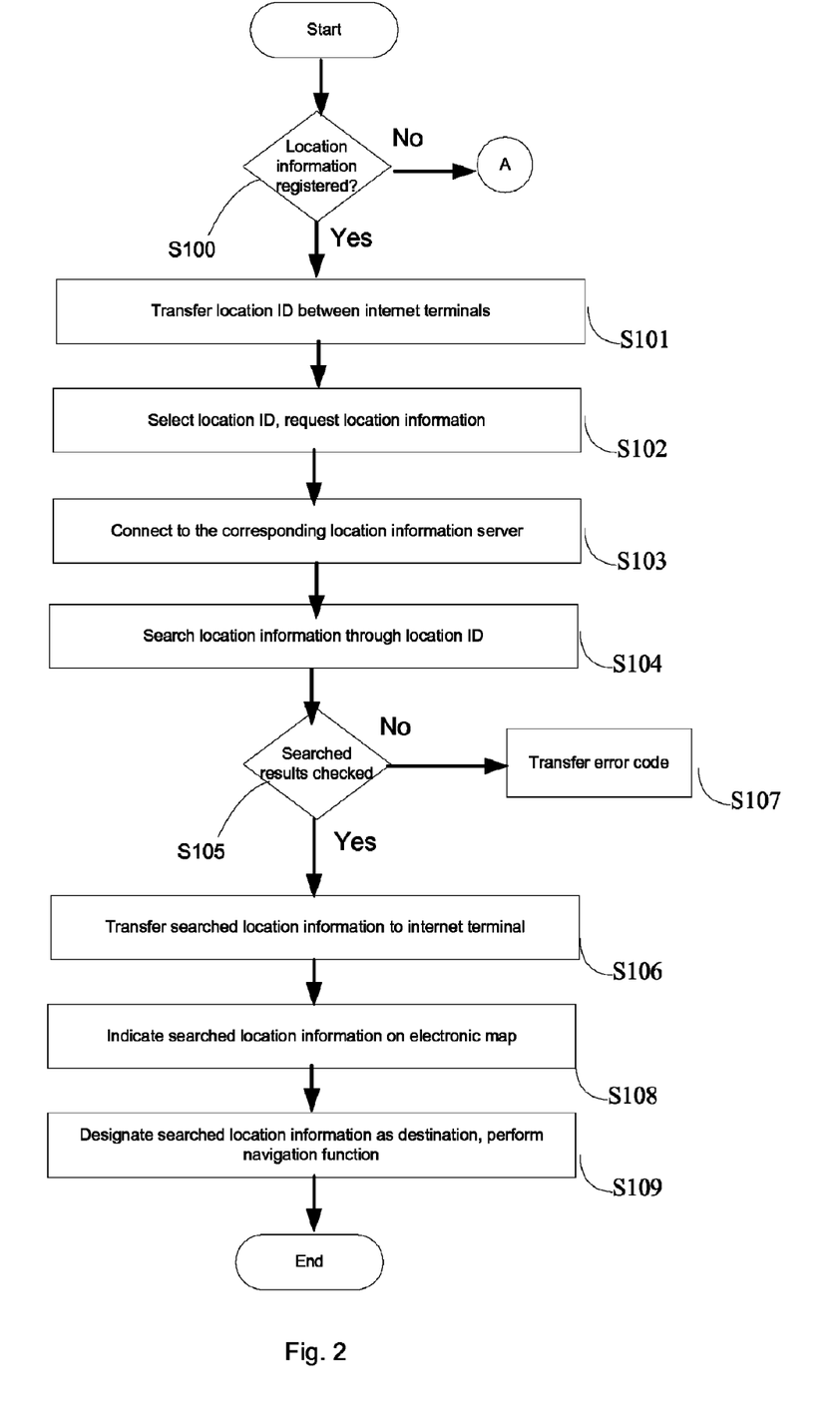
FIG. 2 is a flow chart for showing a method for sharing location information based on wired and wireless Internet using location ID according to a preferred embodiment of the present invention.

FIG. 2 is a flow chart for showing the method for sharing location information based on wired and wireless Internet using location ID according to a preferred embodiment of the present invention.

First, the user, after connecting a location information server whose 'DomainName' is registered in the domain name management server through the domain name management server, checks whether or not a desired location information with its corresponding location ID is registered (S100), and registers a new location ID with the desired location information if not registered. A process for registering the location information will be described referring to FIG. 4. That is, the user inputs location coordinate, to be registered, through the wired and wireless Internet terminals 10*a* to 10*n* (S300). At this time, if the wired and wireless Internet terminals 10*a* to 10*n* include the GPS receiver, the present location coordinates received through the GPS receiver are inputted automatically. The user directly inputs a value of the location coordinates in letters or figures through the wired and wireless Internet terminals 10*a* to 10*n* if the user knows the value of the location coordinate to be registered. If the user does not know the value of the location coordinate, when the user designates the desired location or area, which is indicated on the electronic map on the wired and wireless Internet terminals 10*a* to 10*n* using an address, a trade name, a telephone number or an index map, the location coordinate corresponding to the location designated by the user are inputted automatically.

Figure 4:
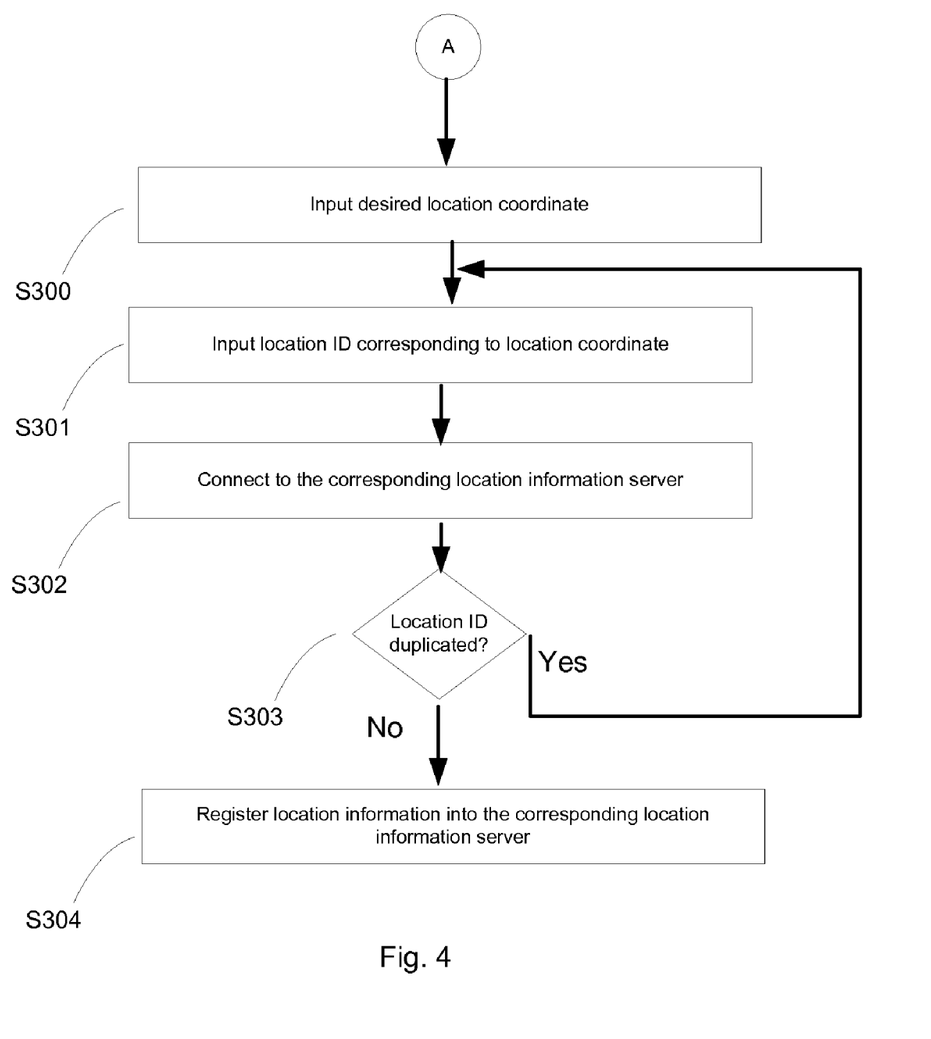
FIG. 4 is a flow chart showing a process for registering location information according to the present invention.

When the location coordinate is inputted, the user inputs the location ID corresponding to the location coordinates in the same way as in FIG. 1 (S301). When the location information including the location coordinate and the location ID corresponding to the location coordinate is transferred to the location information servers 20*a* to 20*n* corresponding to 'DomainName' of the location ID, the terminals are connected to the location information servers 20*a* to 20*b* (S302) through domain name management server. After that, it is checked whether or not 'PointID' of the location ID is duplicated (S303) in the connected location information server, and if not, the location ID is registered to the corresponding location information server 20*a* to 20*n* (S304). Of course, if the location ID is duplicated (namely, if the user ID corresponding to the location coordinate is duplicated), duplication message is transmitted to the wired and wireless Internet terminals 10*a* to 10*n*. Then, the users must return to the step 301, and inputs a new location ID. After the location information is registered, when the users input the location ID registered to the location information servers 20*a* to 20*n* through the wired an wireless Internet terminals 10*a* to 10*n*, the location ID is converted into the form of URL for Internet access, such as 'http://epmap.egosio.com/d/?epid= PointID&epdn=DomainName' as an example, including 'PointID' and 'DomainName' of location ID as parameters as well as URL of web site for providing the location ID related information or service, and the converted URL or the location ID itself is transmitted to other wired or wireless Internet terminals 10*a* to 10*n*, so that a number of wired or wireless Internet terminals 10*a* to 10*n* can transmit and receive the location ID or the converted URL between them (S101).

By using the wired and wireless Internet terminal 10*a* to 10*n* of a receiving side, a user selects the received location ID or the converted URL and sends it to the Web server corresponding to the domain name in the converted URL (for example, http://epmap.egosio.com), which provides the location ID related service to the Internet terminals, to request the location information (S102) corresponding the location ID. The location ID can be selected by cursor control units of various types, such as a mouse of the wired and wireless Internet terminals 10*a* to 10*n*, a button of all directions, an input pen of a touch screen, a track ball, or others. When the user selects the location ID in document, which is internally replaced by the converted URL corresponding to the location ID, to request the location information, the terminal is automatically connected to a general web server 40 corresponding to the domain name of the converted URL (for example as above, http://epmap.egosio.com), for requesting to search the desired location information corresponding to 'PointID' with 'DomainName' of the location ID. The general web server 40 connects to the corresponding location information server 20*a* to 20*n* in which the location information with its corresponding location ID is registered (S103) by using 'Domain-Name' of the location ID through the domain name management server 30, and searches the registered location information through the location ID (S 104). The user checks the searched result (S105), and if the search is carried out normally, the searched location information is transmitted to the wired and wireless Internet terminal 10*a* to 10*n* requesting the location information (S106). If the search is failed, an error code of cause of the search failure is transmitted to the wired and wireless Internet terminal 10*a* to 10*n* requesting the location information (S107). The searched location information includes the location ID and the location coordinate corresponding to the location ID.

Furthermore, the searched location information may be indicated as a symbol on the electronic map through a GIS (Geographical Information System) software of the wired and wireless Internet terminals 10*a* to 10*n* (S108), or perform the navigation function by the searched location information as the destination (S109).

Figure 3:
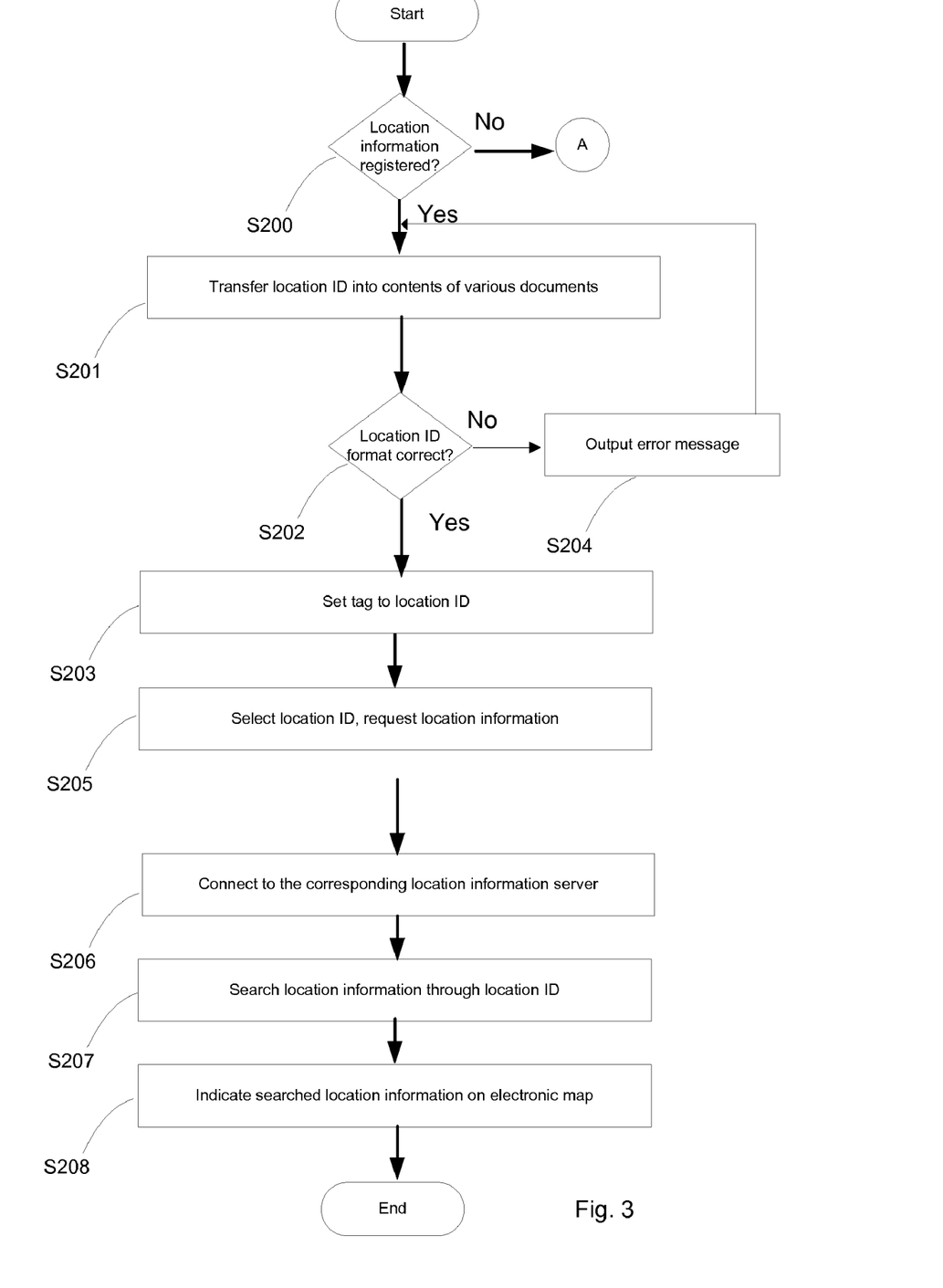
FIG. 3 is a flow chart for showing a method for sharing location based on wired and wireless Internet using location ID according to another preferred embodiment of the present invention.

FIG. 3 is a flow chart for showing the method for sharing location information based on wired and wireless Internet using location ID according to another preferred embodiment of the present invention.

First, as in the embodiment of FIG. 2, the user checks whether or not the location information is registered (S200), and registers the location information if the location information is not registered. The process for registering the location information is the same as in FIG. 4. After the location information is registered, the user inputs the location ID into contents of various documents of the wired and wireless Internet terminals 10*a* to 10*n* (S201), or loads various documents containing the location ID.

As described above, the location ID is inputted in the format (for example, "szeeless#gg21.co.kr"), in which the 'PointID', the location ID symbol (#) and 'DomainName' are combined. The various documents include documents made by a PIM (Personal Information Management) software having an address book, a calendar, a note pad, and others, documents made by writing function in bulletin board on Web-pages, documents made by various document writing machines or editors, documents made as an E-mail, documents made by messengers, and documents made by a SMS (Short Message Service) of cellular phones.

When the location ID is inputted in the various documents, the format of the location ID is checked (S202). After that, the location ID has an underline automatically formed by smart tag or other similar way and is converted to a predetermined color, like szeeless#gg21.co.kr as an example, to allow the user to easily discriminate the location ID (S203) , and also the location ID is converted internally into the form a of URL which is composed of the domain name of a general web server and 'PointID' and 'DomainName' of the location ID as parameters (such as 'http://epmap.egosio.com/d/?epid= PointID&epdn=DomainName' as an example). If the location ID does not conform to the predetermined form, an error message is outputted (S204), and the step is returned to the step 201.

As described above, when the user selects the location ID presented in the form of 'PointID#DomainName' or in the form of the converted URL to request the location information corresponding to the location ID (S205) after inputting the location ID into the contents of the various documents or loading the various documents containing the location ID, the terminal is connected to the general web server 40 by using the domain name of the converted URL for requesting to search the desired location information corresponding the location ID. The general web server is connected to the corresponding location information server 20a to 20n (S206) by using 'DomainName' of the converted URL through the domain name management server 30, and searches the registered location information by using 'PointID' of the converted URL (S207). The searched location information is transmitted to the wired and wireless Internet terminal 10a to 10n requesting the location information, and can be indicated as a symbol on the electronic map through the GIS software (S208). The searched location information includes the location ID and the location coordinate corresponding to the location ID.

The step 207 includes a searched result checking step for checking whether or not the search of the registered location information is carried out normally, and if the search is not carried out normally, the error code of the cause of failure is transmitted to the wired and wireless Internet terminal 10a to 10n requesting the location information.

As described in the embodiment of FIG. 2, the location ID or internally the converted URL corresponding to the location ID can be selected by cursor control units of various types, such as a mouse of the wired and wireless Internet terminals 10a to 10n, a button of all directions, an input pen of a touch screen, a track ball, or others. Furthermore, the searched location information may perform the navigation function for guidance of the road by being designated as a destination.

As described above, according to the embodiments of the present invention, through the steps of inputting the location information including the location coordinate and the location ID corresponding to the location coordinate through the wired and wireless Internet terminals, registering the location information to one or more location information servers, commonly sharing the registered location ID between the wired and wireless Internet terminals, and automatically searching the location-information corresponding to the location ID when the user selects the location ID received between the wired and wireless Internet terminals or the location ID contained in various documents, the searched location information is received and indicated on the electronic map and can perform the navigation function for guidance of road.

In some applications with location ID, there is no need to convert the location ID into the URL format and use directly the location ID in the form of 'PointID#DomainName'. For example, the application program in the terminal (10) extracts 'DomainName' as well as 'PointID' from the location ID and connects to the location information server (20) corresponding to 'DomainName' through the domain name management server (30) for requesting the connected location information server to search the desired location information corresponding to 'PointID'. The connected location information server searches the location information in its database by using 'PointID' and sends the searched result to the requesting terminal. Then the terminal uses the received location information for displaying on the map or for GPS navigation.

INDUSTRIAL APPLICABILITY

As described above, by the method for sharing location information based on wired and wireless Internet using location ID, the location information including the location coordinate and its corresponding location ID is inputted through the wired and wireless Internet terminals, registered to one or more location information servers, and commonly shared between the wired and wireless Internet terminals, so that the users can search and utilize the location information corresponding to the location ID.

Additionally, according to the present invention, when the user selects the location ID received between the wired and wireless Internet terminals or the location ID contained in various documents, the terminal is automatically connected to the location information servers directly in case that the domain name of the converted URL is same as the domain name of the location information server or through a general web server. Therefore, the present invention can search the location information through the location ID, receive and indicate the searched location information on the electronic map, and perform the navigation function by designating the location information as the destination.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A location information sharing method based on wired and wireless internet using location identification (ID), the method is characterized by:

converting a location ID in the form of 'PointID#DomainName' entered in the content of documents through wired or wireless Internet terminals into a URL which is composed of domain name of a general web server, providing location ID related services to the Internet terminal, and 'PointID' and 'DomainName' of the location ID as parameters of the URL;

transmitting and receiving documents including the converted URL between the wired or wireless Internet terminals;

connecting a general web server, wherein a wired or wireless terminal connects with a general web site corresponding to the domain name of the converted URL for requesting to search the location information corresponding to 'PointID' with 'DomainName' of the location ID, searching a desired location information from one of plural location information servers by using 'PointID' with 'DomainName' of the location ID, wherein the general web server connects with one of plural location information servers by using 'DomainName' of the location ID through the domain name management server and request the connected location information server to search a location information corresponding to 'PointID' of the location ID;

transmitting the location information including a coordinate value searched corresponding to the location ID from the location information server to the wired or wireless terminal requesting the location information, directly or through the general web server; and performing application function including viewing map around a location coordinate contained in the searched location information corresponding to location ID on the wired or wireless terminal.

2. The method according to claim 1, wherein the method further comprises the step of performing a navigation function of the terminal with positioning device, GPS (Global Positioning System) or Galileo, by designating a location ID as a destination and performing the navigation function using the searched location coordinates corresponding to the location ID.

3. The method according to claim 1, wherein the separator symbol in said location ID is #, !, $, %, & or *.

4. The method according to claim 1, wherein the wired and wireless Internet terminals are computers, notebooks, cellular phones, PDAs (Portable Digital Assistants), GPS terminals and telematics terminals capable of wired or wireless Internet connection.

5. The method according to claim 1, wherein the documents comprise files created by PIM (Personal Information Management) software having an address book and a calendar, documents written in electronic bulletin board, documents made by office tool including 'Word', 'Power Point' or 'Excel', documents written as an e-mail, documents made by messengers, and documents made by a SMS (Short Message Service) and MMS(Multimedia Message Service) of cellular phones.

6. The method according to claim 1, wherein the documents comprise files created by office software.

7. The method according to claim 1, wherein the documents comprise e-mails, SMS (Short Message Service) and MMS(Multimedia Message Service).

* * * * *